United States Patent [19]
Yoo et al.

[11] Patent Number: 6,130,401
[45] Date of Patent: Oct. 10, 2000

[54] DEVICE AND METHOD FOR MACHINING TRANSPARENT MEDIUM BY LASER

[75] Inventors: Tae Kyung Yoo; Jun Ho Jang, both of Kyonggi-do, Rep. of Korea

[73] Assignee: LG Electronics Inc., Seoul, Rep. of Korea

[21] Appl. No.: 09/358,768

[22] Filed: Jul. 22, 1999

[30] Foreign Application Priority Data

Jul. 29, 1998 [KR] Rep. of Korea ...................... 98-30620

[51] Int. Cl.[7] .................................. B23K 26/40
[52] U.S. Cl. ................................ 219/121.6; 219/121.69; 219/121.72; 219/121.85
[58] Field of Search ........................... 219/121.6, 121.67, 219/121.68, 121.69, 121.72, 121.85, 121.82, 121.78, 121.66; 156/272.8; 264/400

[56] References Cited

U.S. PATENT DOCUMENTS

| | | | |
|---|---|---|---|
| 3,549,733 | 12/1970 | Caddell | 219/121.69 |
| 4,562,333 | 12/1985 | Taub et al. | 219/121.69 |
| 5,801,356 | 9/1998 | Richman | 219/121.68 |
| 5,987,920 | 11/1999 | Bosman et al. | 219/121.6 X |

FOREIGN PATENT DOCUMENTS

| | | |
|---|---|---|
| 19637255 | 12/1997 | Germany . |
| 55-11876 | 1/1980 | Japan . |
| 1-271084 | 10/1989 | Japan . |
| 6-155920 | 6/1994 | Japan . |
| 9-138417 | 5/1997 | Japan . |
| 2126956 | 4/1984 | United Kingdom . |

*Primary Examiner*—Gregory Mills
*Attorney, Agent, or Firm*—Fleshner & Kim, LLP

[57] ABSTRACT

Transparent media having high hardness and poor light absorption is cut or scribed with characters or figures by a laser beam. The method includes forming a support of a medium which is a good absorber of a laser beam, and placing the transparent medium on the support, and focusing the laser beam onto the support through the transparent medium while the transparent medium and the laser beam are moved relative to each other. A flame is generated between the support and the transparent medium to machine the transport medium, allowing it to be cut or scribed with characters or figures.

13 Claims, 10 Drawing Sheets

DEVICE AND METHOD FOR MACHINING TRANSPARENT MEDIUM BY LASER

BACKGROUND OF THE INVENTION

1. Field of the Invention

The present invention relates to devices and methods for machining a transparent medium, and more particularly, to devices and methods for machining a transparent medium by a laser, in which a transparent medium having a high hardness and poor in light absorption is cut or has characters or figures written into by a laser beam.

2. Background of the Related Art

Media having high hardness and transparent to light, such as glass, sapphire, silicon carbide (SiC) have a wide variety of applications, such as various windows, optical devices, LCD (liquid Crystal Display), PDP (Plasma Display Panel), and different fine tuning instruments which require high resistance to wear. Additionally, materials such as sapphire and silicon carbide are widely used as substrate materials of optical devices, such as visible (red, green, and blue and etc.) light emitting diode, laser diode, and electronic devices, such as HBT (hetero-bipolar transistor) and FET (Field Effect Transistor). Therefore, a machining technology for ready and easy cutting of those materials or writing characters or figures therein is an important technology having a great influence to the industrial fields. In the past, material with a high hardness has been processed mechanically or optically. In mechanical machining, a cutting tool of a material tougher than a workpiece, such as a diamond tip or diamond blade, is used. In optical machining, a thermal energy of light, such as a laser beam, is used.

A related art device and method for machining a transparent medium will be explained with reference to attached drawings. FIG. 1 schematically illustrates cutting a glass substrate using a related art diamond tip, and FIG. 2 schematically illustrates cutting a glass substrate using a related art diamond blade.

Referring to FIG. 1, in the cutting of a transparent medium using a related art diamond tip, a workpiece, such as glass plate 1 with a high hardness, is scribed with the diamond tip 2, to make a scratch 3 in the glass plate 1, and has a mechanical stress applied thereto, for breaking the glass plate 1 into two pieces along the scratch 3.

And, referring to FIG. 2, in the cutting of a transparent medium using a related art diamond blade, a disk of diamond blade 4 is rotated at a high speed, and workpiece such as a glass plate 5 is moved against the diamond blade 4 to wear off the glass plate 5 along a cutting line, thereby cutting the glass plate 5. In this instance, since the diamond blade 4 rotated at a high speed, fine powder of glass and the like is emitted. Fluid, such as water or oil, is sprayed to the cutting portion using a nozzle 7, for preventing powder emission.

FIG. 3 schematically illustrates cutting a glass plate with a carbon dioxide laser, and FIG. 4 schematically illustrates additional use of a supplementary frame and a gas ejecting nozzle for the cutting of a glass plate with a carbon dioxide laser.

Referring to FIG. 3, in using the laser, a laser beam 9 from a laser 8 is focused onto a workpiece 11 by a lens 10, while the workpiece 11 is moved, to melt the workpiece 11 along a cutting line 12. The laser 8 should provide a laser beam of a wavelength which can be well absorbed by the workpiece 11 according to the absorption property of the workpiece 11 material. In this instance, the transparent medium may be processed with supplementary devices added thereto, such as a supplementary frame 13 with a good thermal conductivity placed along the cutting line to set up a direction of heat dissipation and to minimize cracking of the medium in random directions. A fine nozzle 14 blows a gas to the cutting portion to blow down molten material.

Because the related art transparent media machining methods should be employed appropriately considering properties of the workpiece and cost involved, a method with a good workability and better cost should be selected considering advantages/disadvantages of the different methods in various fields.

However, the related art devices and methods for machining a transparent medium have the following problems.

First, the simplest and oldest method, in which a scratch is made in the workpiece with a related art diamond tip and a mechanical stress is applied to the workpiece to break the workpiece into two, which has been developed in many ways from a small tool for manual scratching a line and breaking the workpiece to a large scale equipment, has problems with breaking the workpiece into two pieces because the scratch is insufficiently deep, causing difficulty in breaking along the scratch. Particularly, if the medium is sapphire or silicon carbide (SiC), the workpiece to be cut should be below a certain thickness; if the thickness is greater than permitted (in a range of 100 $\mu$m in cases of optical devices or electronic devices), the breaking after the scribing is more difficult due to a hardness of the workpiece medium. To obtain an appropriately thin thickness, a complicated and careful lapping, a process ahead of the breaking, is required. Moreover, the bending caused by the thin thickness adds difficulty to the breaking.

Second, periodical change of the diamond tip is required for workpieces with high hardness, such as glass plate, cut with the diamond tip, causing additional cost increase. Particularly, scribing and breaking equipment have high costs.

Third, the related art mechanical methods have difficulty in cutting a curved line inherent in this method, and a low speed. Therefore, it is not suitable for scribing characters or figures other than cutting plates. Further, the workpiece or the equipment should be aligned along a crystal direction, and a direction of the scribing and breaking should be determined, accordingly.

Fourth, although the related art method of using diamond blade can cut a comparatively thick medium, the diamond blade causes great physical damage to the workpiece with a poor cut surface. Because a blade thickness can not be reduced below a certain limit, and more material of the workpiece is consumed than the blade thickness a low productivity (i.e., a number of chips per unit area) results. Therefore, application of this method to fine cutting line applications is difficult. Moreover, the related art method of using a diamond blade has a very slow cutting speed, with a poor production rate, and creates dust requiring water spray using the nozzle 7 as shown in FIG. 2.

Fifth, though the method of cutting with a laser beam which is absorbed well can cut the workpiece in a desired form, there is a high probability of failure in the cutting due to random cracking occurred in the workpiece caused by local heating when performed at room temperature. Therefore, the workpiece should be kept close to a softening temperature during cutting, or, as shown in FIG. 4, supplementary devices should be used, such as a supplementary frame with a good thermal conductivity placed along the cutting line to set up a direction of heat dissipation, minimizing cracking of the medium in random directions, and a fine nozzle for blowing a gas to the cutting portion should be used to blow down molten material.

Sixth, since the carbon dioxide gas laser used mostly in cutting a glass plate is difficult to focus into an area smaller than a few hundred micrometers, the carbon dioxide gas laser has a limitation in fine cutting. And, as a laser should be used which is absorbed well to the workpiece medium without fail, a laser which is absorbed well to the workpiece medium is additionally required for cutting a transparent medium, even if a small sized solid state laser of a visible light range or a near infrared ray range which are used frequently in the industrial field.

SUMMARY OF THE INVENTION

Accordingly, the present invention is directed to devices and methods for machining a transparent medium by a laser that substantially obviates one or more of the problems due to limitations and disadvantages of the related art.

An object of the present invention is to provide devices and methods for machining a transparent medium by a laser, which permits cutting or scribing characters or figures into a transparent medium, such as glass, sapphire, or SiC and the like or various media formed based on the transparent medium with a solid state laser of visible light or near infrared ray range which is used frequently in the industrial field.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for machining a transparent medium by a laser includes support means of a material which absorbs the laser beam better than the transparent medium for supporting the transparent medium, laser beam generating means for providing a laser beam onto the support means through the transparent medium, and moving means for moving either the support means or the laser beam.

In another aspect of the present invention, there is provided a method for machining a transparent medium by a laser including the steps of forming a support of a medium which is a good absorber of a laser beam, and placing the transparent medium on the support, and focusing the laser beam onto the support through the transparent medium while the transparent medium and the laser beam are made to have a relative movement, thereby machining the transparent medium, permitting the laser beam to cut or scribe characters or figures in a transparent medium.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

FIRST EMBODIMENT

Figure 1:
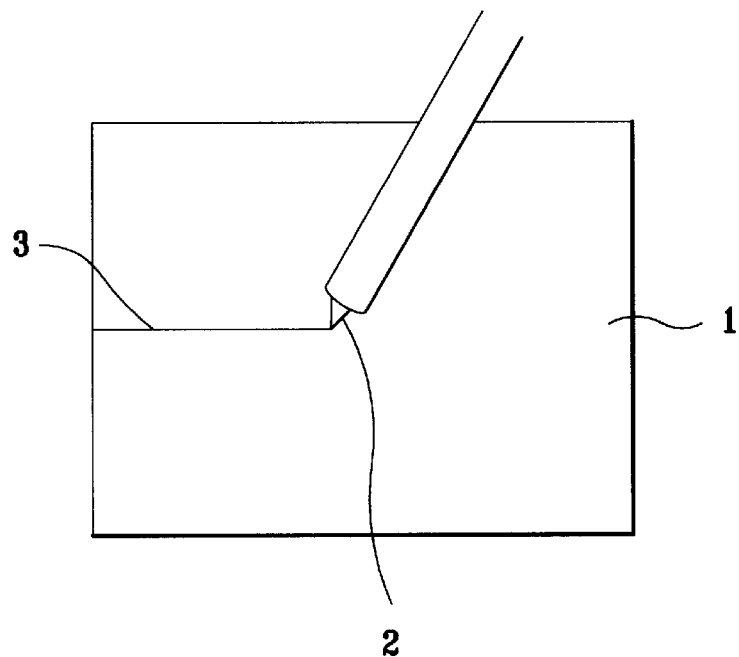
FIG. 1 illustrates cutting a glass substrate using a related art diamond tip schematically.
Figure 2:
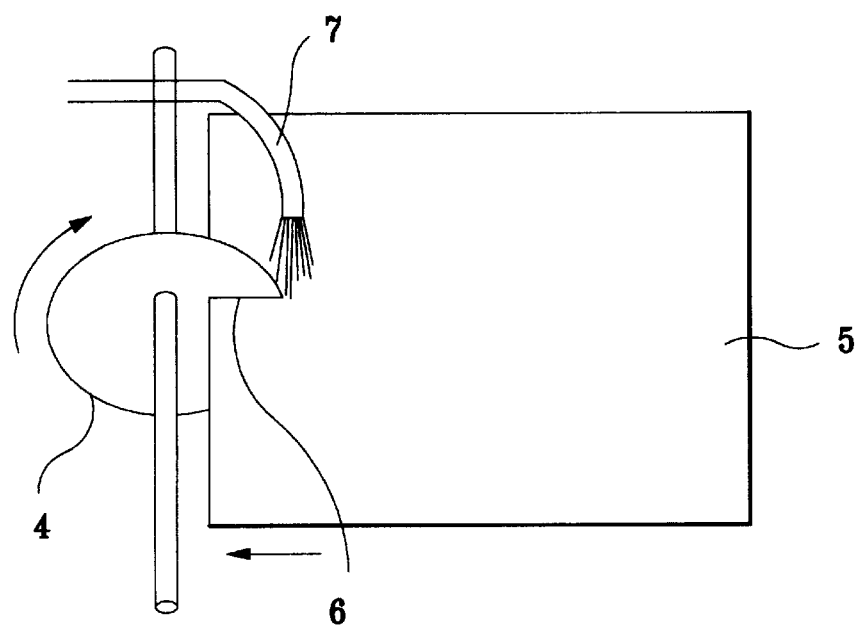
FIG. 2 illustrates cutting a glass substrate using a related art diamond blade, schematically.
Figure 3:
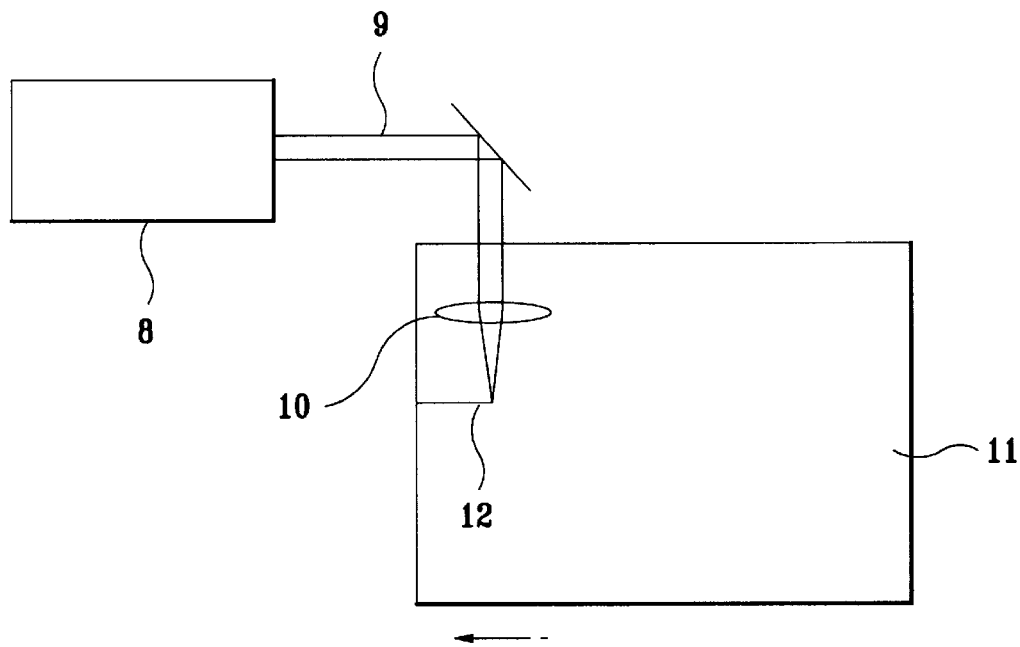
FIG. 3 illustrates cutting a glass plate with a carbondioxide laser schematically.
Figure 4:
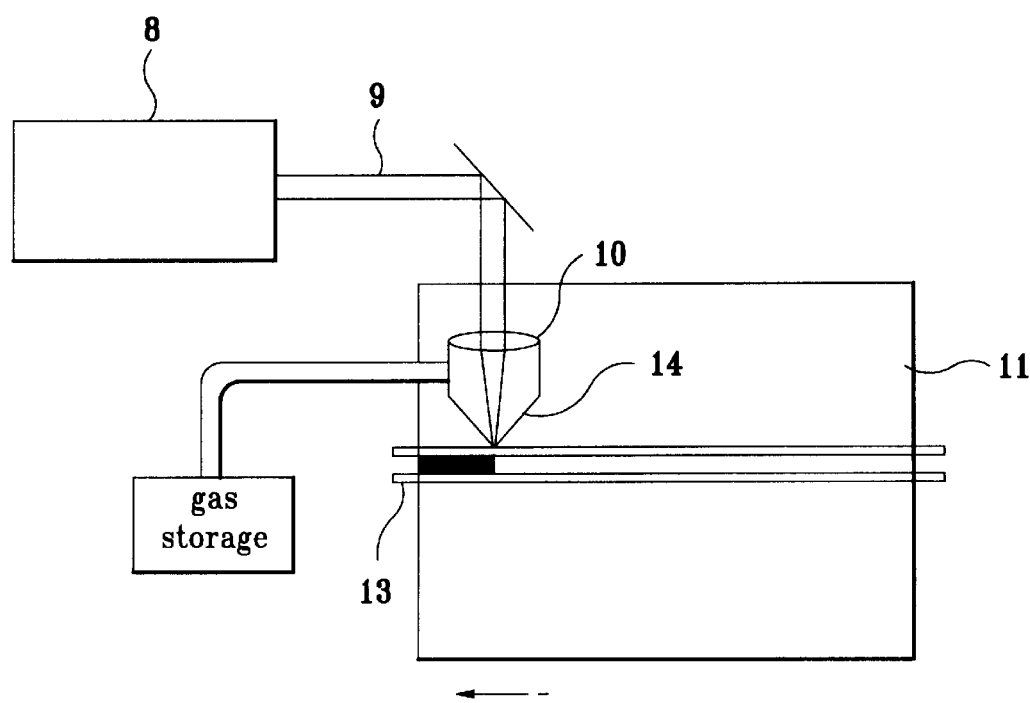
FIG. 4 illustrates additional use of a supplementary frame and a gas ejecting nozzle to the cutting of a glass plate with a carbondioxide laser, schematically.
Figure 5:
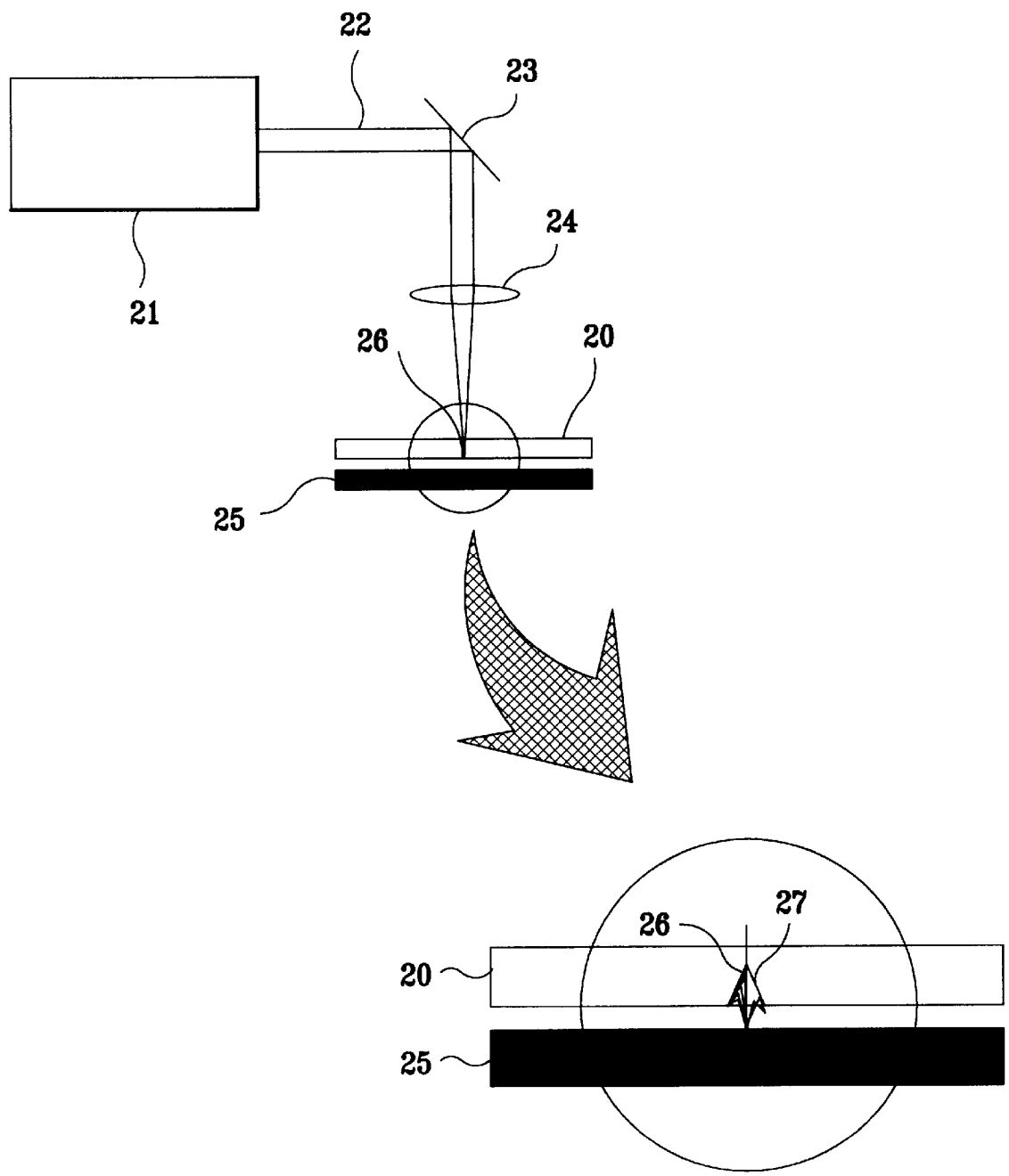
FIG. 5 illustrates machining a transparent workpiece mounted on a support with a laser beam directed thereto in accordance with a first preferred embodiment of the present invention (drawing in the circle is an partial enlarged view)
Figure 6:
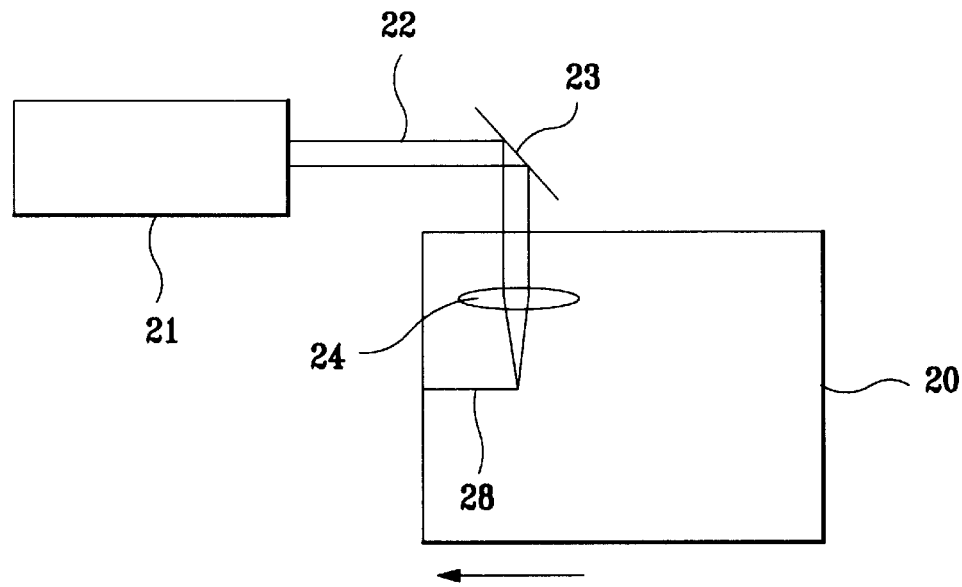
FIG. 6 illustrates moving the workpiece while the focused laser beam is fixed in the first embodiment of the present invention.
Figure 7:
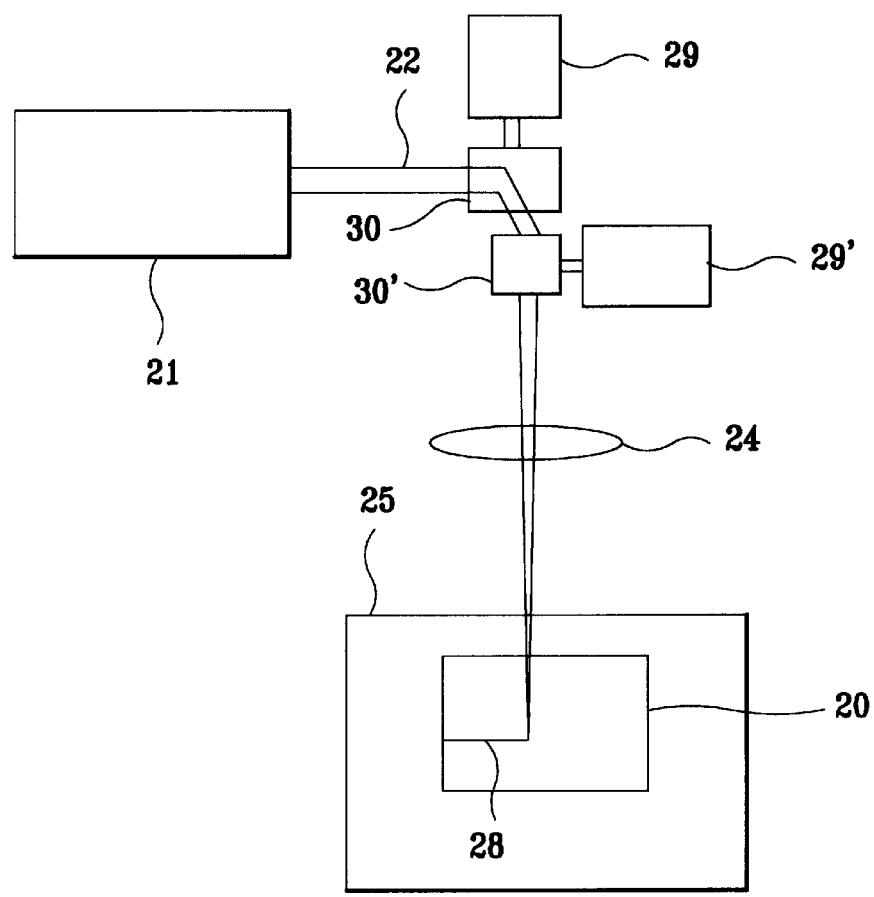
FIG. 7 illustrates cutting a workpiece with a focused laser beam reflected by two rotating mirrors in the first preferred embodiment of the present invention.

FIG. 5 illustrates machining a transparent workpiece mounted on a support with a laser beam directed thereto in accordance with a first preferred embodiment of the present invention, FIG. 6 illustrates moving the workpiece while the focused laser beam is fixed in the first embodiment of the present invention, and FIG. 7 illustrates cutting a workpiece with a focused laser beam reflected by two rotating mirrors in the first preferred embodiment of the present invention.

Referring to FIG. 5, a device for machining a transparent medium by a laser in accordance with a first preferred embodiment of the present invention includes a support 25 of a material, such as aluminum, iron, or copper, which is a good absorbent of a laser beam. A flame is generated by intense laser pulses. A workpiece of glass, sapphire, or silicon carbide (SiC) is mounted on support 25. A laser 21 emits a laser beam 22, a reflection mirror 23 reflects the laserbeam in one direction, and a lens 24 focuses the laser beam 22 reflected by the reflection mirror 23 toward the workpiece 20. As shown in FIG. 6, if the laser beam is fixed while the support 25 is moved in the cutting of the workpiece, a moving device for moving the support 25 in a desired direction is additionally required. And, as shown in FIG. 7, if the workpiece is fixed while the laser beam is moved, two reflection mirrors 30 and 30' for moving the laser beam, two motors 29 and 29' for driving the reflection mirrors, and, although not shown, a controller for controlling the motors are also included. Additional reflection mirrors and driving motors may be added to the reflection mirrors 30 and 30' and the driving motors 29 and 29' for finer control, and the reflection mirror 23 and the lens 24 shown in FIG. 5 may be integrated, including driving means and control means for moving the reflection mirror 23 and the lens 24.

A method for machining a transparent medium by a laser in accordance with a first preferred embodiment of the present invention will be explained.

Upon focusing a laser beam 22 emitted from a laser 21 onto a transparent workpiece 20 mounted on a support 25 through a reflection mirror 23 and a lens 24, a flame 26 is produced together with local heat at a surface of the support 25. The back surface of the workpiece 20 in contact with the support 25 is locally heated and melted to form a deep groove 27 in the back surface. The laser beam 22 emitted from the laser 21 is alternately put into sudden oscillation and non-oscillation states by a Q switch, as shown in FIG. 6. Either the workpiece 20 is moved by moving the support 25 along a cutting line 28 or, as shown in FIG. 7, a focusing point of the laser beam 22 is moved in succession along the cutting line by driving two reflection mirrors 30 and 30' disposed in a path of the beam using motors 29 and 29' while the support 25 and the workpiece 20 is fixed, for making the above groove as desired. In this instance, by adjusting a laser power taking a thickness and physical properties of the workpiece into consideration, the groove may be fully formed through the thickness to directly separate the workpiece into two pieces, thereby cutting the workpiece. Alternatively, the groove may be formed to a certain depth of the thickness, followed by application of a mechanical stress thereto, to separate the workpiece into two pieces. In the case of moving the support while the laser beam is fixed, the support may be moved manually or, though not shown, moving means and control means for controlling the moving means may be provided so that a user may input a cutting position and data required for cutting into the control means, to control the driving means according to the input data, thereby moving the support along the cutting direction. Similarly, in the case when the laser beam is moved while the support is fixed, a control means (not shown) for controlling the motors 29 and 29' is provided so that the user may input a cutting position and data required for cutting into the control means, thereby controlling the motors according to the input data, and moving the laser beam along the cutting direction.

SECOND EMBODIMENT

Figure 8:
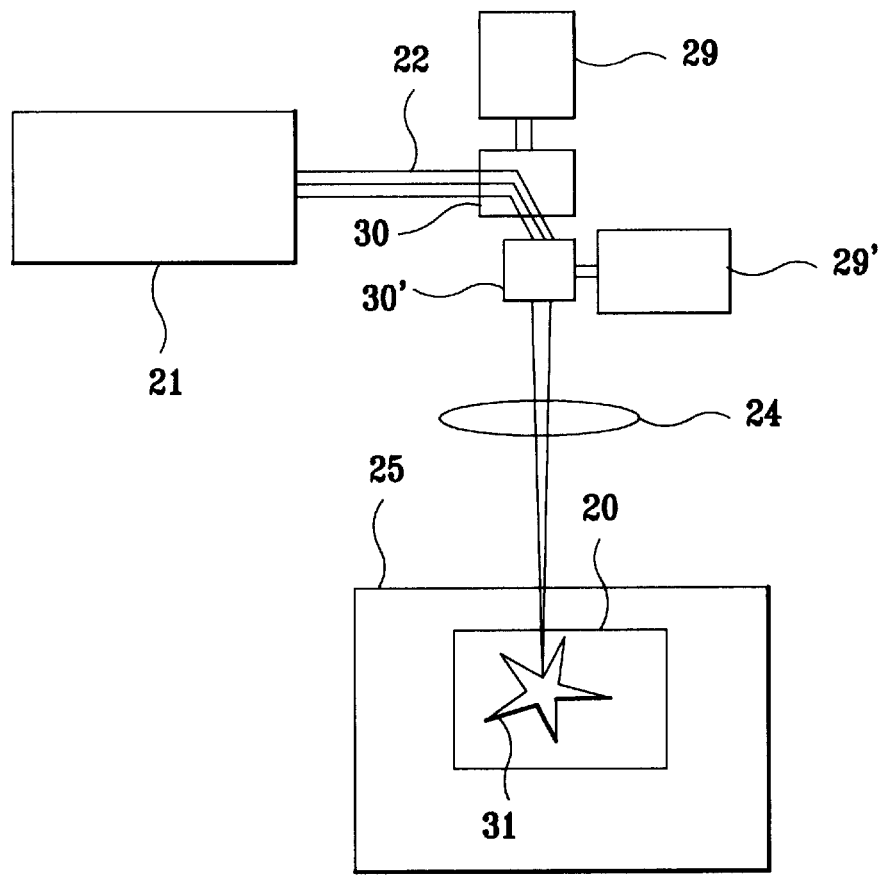
FIG. 8 illustrates scribing a figure into a workpiece with a focused laser beam reflected by two rotating mirrors in a second preferred embodiment of the present invention.
Figure 9:
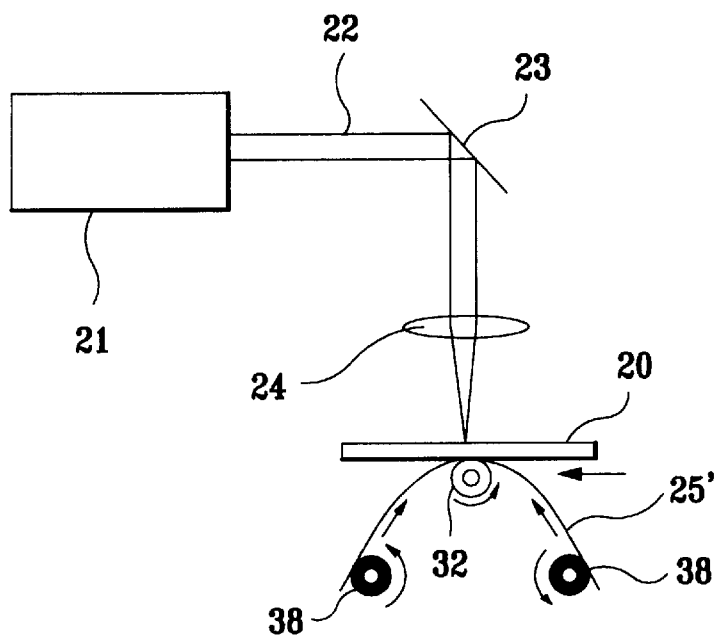
FIG. 9 illustrates a stripe form of workpiece support for continuous feeding to a laser beam focusing point in accordance with a third preferred embodiment of the present invention.

FIG. 8 illustrates scribing a figure into a workpiece with a focused laser beam reflected by two rotating mirrors in a second preferred embodiment of the present invention, and FIG. 9 illustrates a stripe form of workpiece support for continuous feeding to a laser beam focusing point in accordance with a third preferred embodiment of the present invention.

Referring to FIG. 8, two mirrors 30 and 30' are positioned in a laser beam path, and the two mirrors are driven by two motors 29 and 29' so that the laser beam is incident to the lens 24 at different angles, for changing a focusing position of the laser beam 22. Such a technique permits scribing characters and figures in a transparent and hard medium, such as precious stone in addition to cutting. Therefore if data of a desired character or figure is provided to a computer (not shown), and the computer is made to control the motors 29 and 29' which drive the mirrors 30 and 30' such that the mirrors 30 and 30' change the focusing point of the laser beam in a form of the character or the figure, scribing of a desired character or figure in the transparent and hard medium, such as a precious stone, is possible.

THIRD EMBODIMENT

When support 25 in FIG. 5 which produces a flame at the laser focusing point for groove formation is used for a prolonged time period, a great amount of the support is consumed. Therefore, as shown in FIG. 9, in a third embodiment of the present invention, a support 25' is provided in a form of thin stripe. Additionaly, a roll 38 for winding the support 25' thereon, and a roller 32 for guiding the support 25' at a position to which laser beam 22 is focused, are provided, such that the support 25' can be fed continuously. By using such as system, a consumption of the support 25' can be reduced while maintaining a good machining quality.

The aforementioned device and method for machining a transparent medium by a laser is demonstrated in the following Example.

EXAMPLE 1

Cutting of a transparent medium.

A support of a black oxide film coated aluminum plate or steel plate is provided, a 3 mm thick glass plate and 300 $\mu$m thick sapphire are placed on the support respectively, a 30 W solid state laser with an oscillation wavelength of 1.06 $\mu$m is Q switched and focused onto the glass plate or the sapphire, and either the laser beam or the support is moved. As a result, it is observed that the workpiece (glass plate or sapphire) is cut along the line at which the laser is focused and directed. And, in a case a 0.532 $\mu$m laser, a second harmonics of the foregoing laser, is used under the same conditions, cutting of the workpiece is possible. Thus, the device and method for machining a transparent medium by a laser can be usefully applied to general cutting of a transparent medium as well as cutting into an arbitrary form.

FOURTH EMBODIMENT

Optical devices or electronic devices may be used as a workpiece. Such devices may include those fabricated by forming a thin film (a GaN group material) on a medium of sapphire or silicon carbide and passing through different processes. Because various problems can occur if the device is separated by the related art methods discussed in the Background section, the following process is used for fine smooth separation of such devices.

Figure 10A:
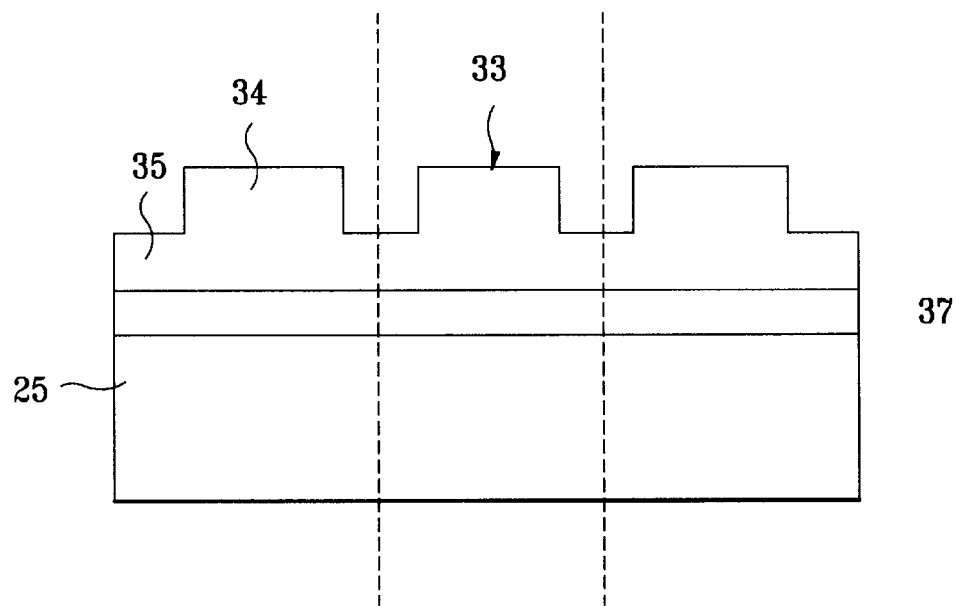
FIGS. 10A and 10B illustrate a side view and a plan view of a basic structure of a device formed of a medium, such as sapphire or SiC, respectively.
Figure 10B:
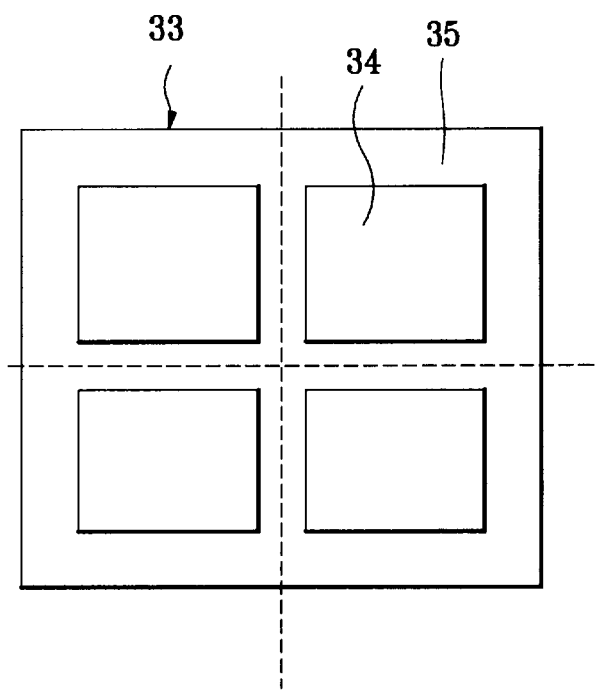
Figure 11A:
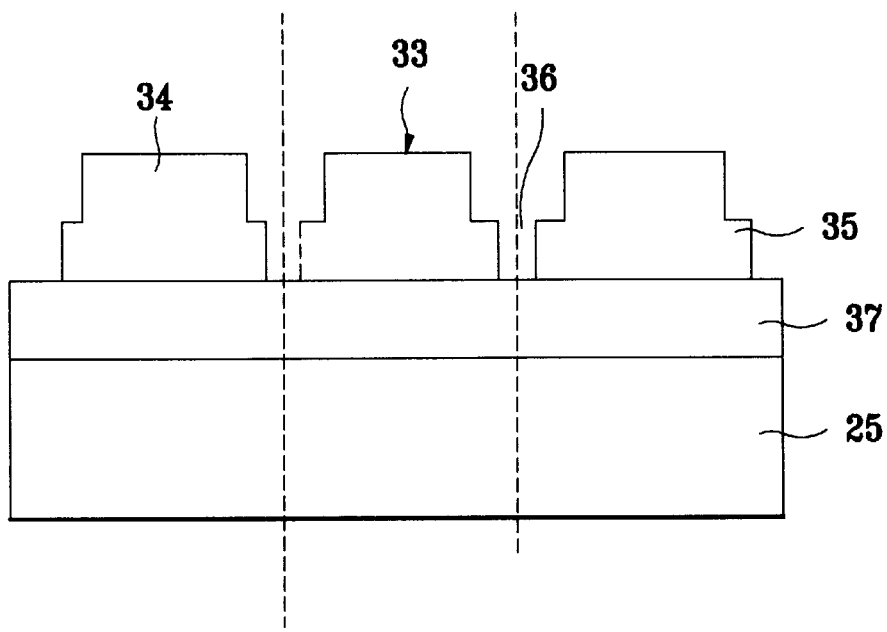
FIGS. 11A and 11B illustrate a side view and a plan view of a basic structure of a device formed of a medium, such as sapphire or SiC respectively, with particular regions of each device are separated in accordance with the present invention.
Figure 11B:
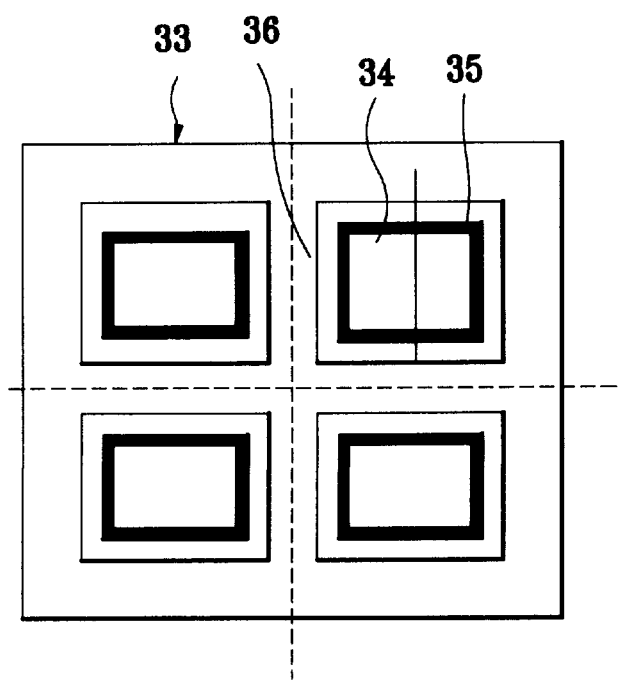
Figure 12:
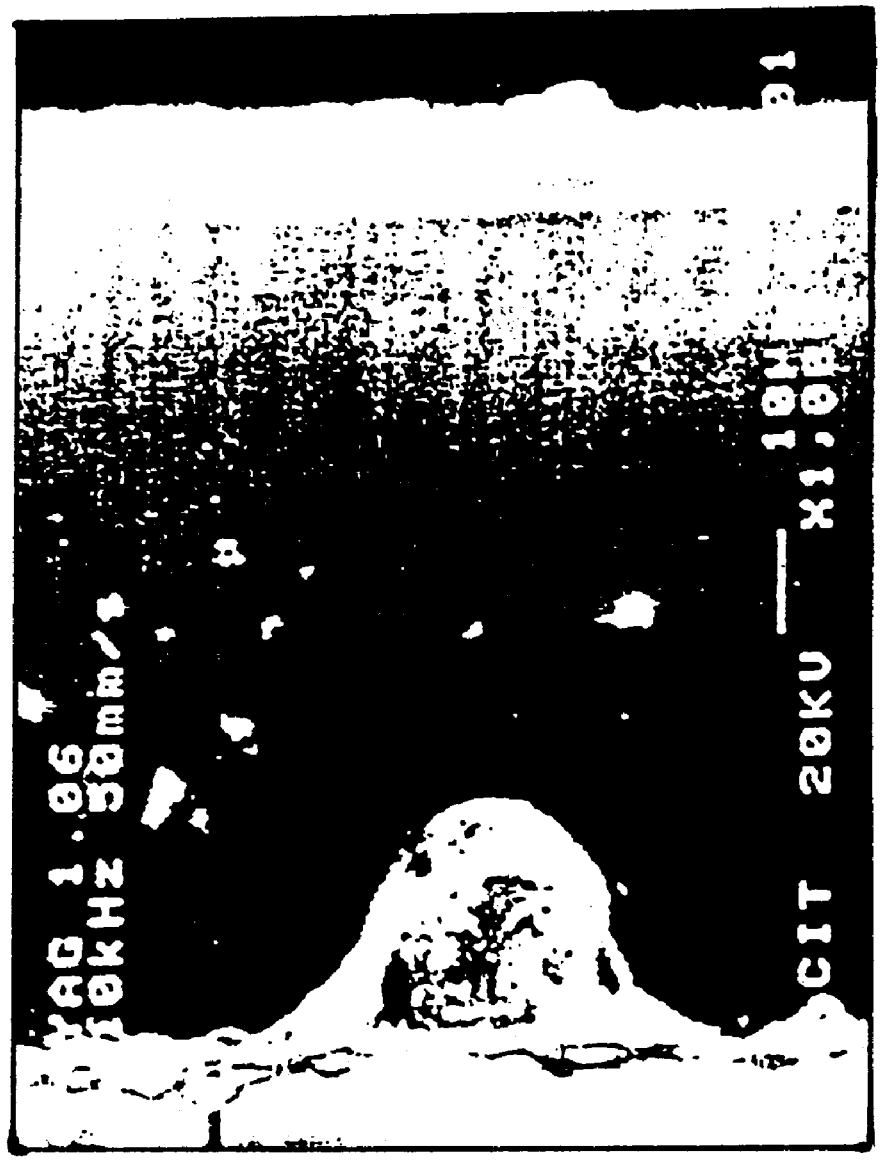
FIG. 12 illustrates a photograph of a scratch in a workpiece formed according to a method for machining a transparent medium by a laser of the present invention.

FIGS. 10A and 10B illustrate a side view and a plan view of a basic structure of a device formed of a medium, such as sapphire or SiC respectively. FIGS. 11A and 11B illustrate a side view and a plan view of a basic structure of a device formed of a medium, such as sapphire or SiC respectively, with particular regions of each device are separated in accordance with the present invention. FIG. 12 illustrates a photograph of a scratch in a workpiece formed according to a method for machining a transparent medium by a laser of the present invention.

Referring to FIGS. 10A and 10B, if there is a thin film device 33 having an active region 34 and a field region 35 formed on a transparent substrate 37, the transparent substrate 37 having the thin film device 33 formed thereon is placed on the support 25. In this instance, since there is a possibility that heat from the focused laser beam is absorbed by, and propagated through the thin film device placed on the support 25, deteriorating device characteristics, a region at which the laser beam is intended to be directed should be perfectly clear of deposited device materials. Therefore, as shown in FIG. 11, if there are materials left from device formation on a region to be cut, the field region 35 is selectively removed to form a trench which exposes the transparent substrate 37. After exposing the transparent substrate 37 in a region to be separated, formation of a thin groove in the substrate and simply breaking the substrate is preferable because full thickness breaking may impact the device. That is, even if a full thickness breaking is possible depending on a device isolation region, it is very effective that the groove is stopped at a certain region of a underlying medium to prevent a thermal impact to a surface if it is intended to separate a very fine region. For example, influences given to the substrate is a Q switching frequency and a running speed of the laser. As shown in FIG. 12, if the laser beam is directed under conditions that the Q switching frequency is 10 kHz, the laser running speed is 50 mm/sec, and a laser power is 5 W, a flaw (width 40 $\mu$m and depth 25 $\mu$m) is formed. This means that the breaking is done readily. After breaking according to the aforementioned process, device characteristics are measured, to find that there has been no change in the device characteristics in comparison to a time before separation of the device. That is, there is no physical impact to the device.

Figure 13A:
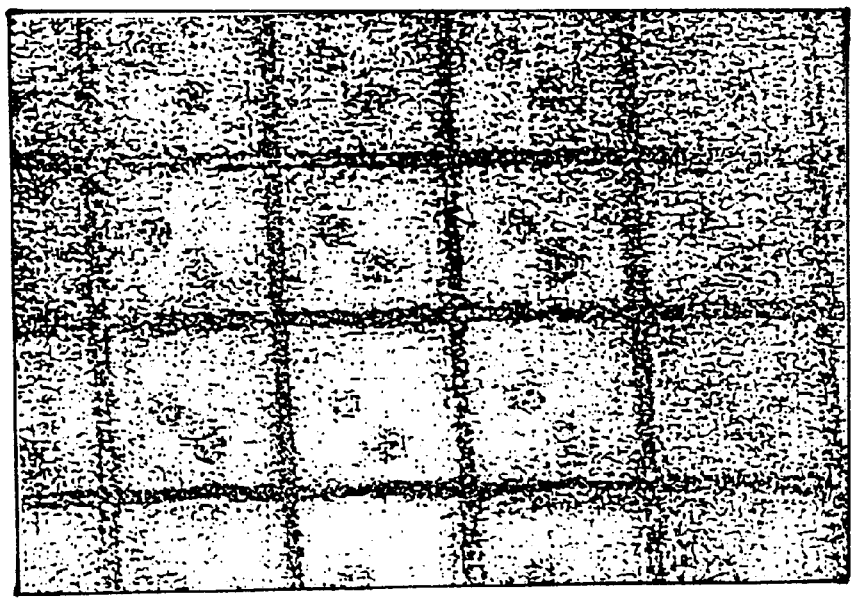
FIG. 13A illustrates a photograph of a device shown in FIGS. 11A and 11B, taken from a device side.
Figure 13B:
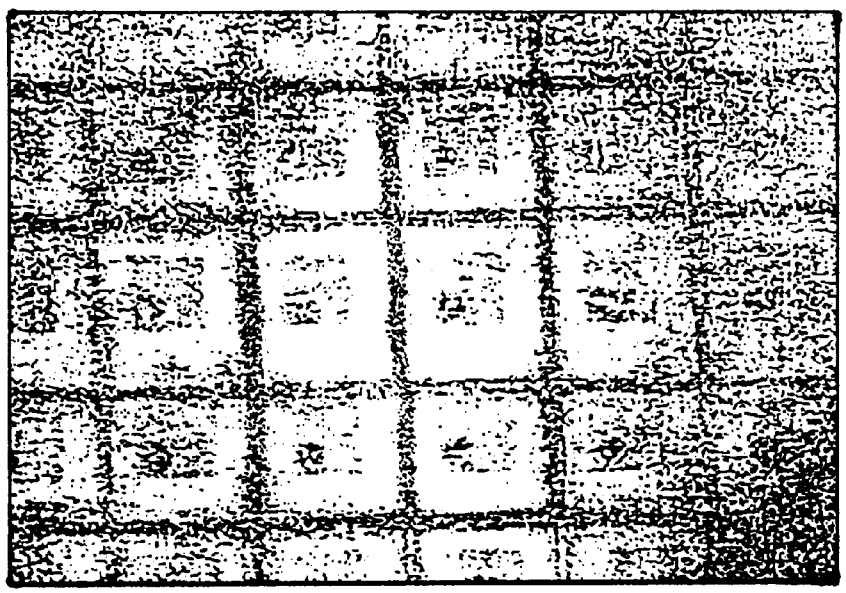
FIG. 13B illustrates a photograph of a device shown in FIGS. 11A and 11B, taken from a medium side; and, FIG. 13C illustrates a photograph of individual devices separated from the devices shown in FIGS. 11A and 11B in accordance with the present invention.
Figure 13C:
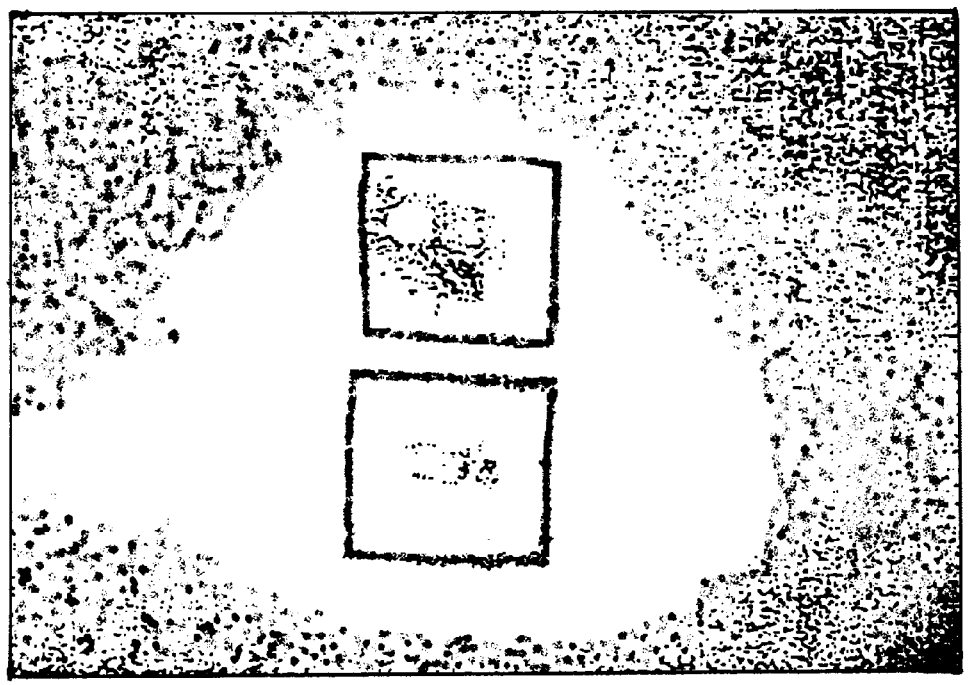

FIG. 13A illustrates a photograph of a device shown in FIGS. 11A and 11B, taken from a device side; FIG. 13B illustrates a photograph of a device shown in FIGS. 11A and 11B, taken from a medium side; FIG. 13C illustrates a photograph of individual devices separated from the devices shown in FIGS. 11A and 11B in accordance with the present invention.

Though not shown in the drawings, when separating devices formed of a transparent medium which is a poor absorber of a laser beam and having a repetitive pattern, thermal impact to the separated devices can be minimized by focusing the laser beam onto the support through a cutting region of the thin film device causing a relative movement between the workpiece and the laser beam such that the focused laser beam is directed to the workpiece in an interlaced scan type. In situations where the support may suffer thermal damage from a high thermal energy laser beam focused thereon, the focused point is cooled to control the thermal impact. In addition to reducing the thermal impact, this cooling can adjust the precision of the processed workpiece.

As has been explained, the device and method for machining a transparent medium by a laser of the present invention has the following advantages.

First, in machining a transparent medium with a high hardness, such as glass, sapphire, or silicon carbide, since a support is formed of a material which is a good absorber of a laser beam and makes a flame on absorption of the laser beam, and a workpiece which is transparent is processed by placing on the support, the transparent medium can be cut or scribed with characters or figures using a laser beam which is scarcely absorbed by the transparent medium.

Second, the device and method for machining a transparent medium by a laser according to the present invention facilitates machining of transparent media, such as glass which has numerous applications, such as various windows, optical devices, liquid crystal displays and plasma display panel, and various fine tuning instruments which require high resistance to wear, and sapphire or silicon carbide (SiC) which have numerous applications as substrate materials of optical devices, such as visible light emitting diode and laser diode, and electronic devices.

Third, because transparent media having a high hardness can be processed by using an inexpensive general solid state laser instead of an expensive gas laser, the devices and methods for machining transparent media by a laser of the present invention is economic and productive.

It will be apparent to those skilled in the art that various modifications and variations can be made in the device and method for machining a transparent medium by a laser of the present invention without departing from the spirit or scope of the invention. Thus, it is intended that the present invention cover the modifications and variations of this invention provided they come within the scope of the appended claims and their equivalents.

What is claimed is:

1. A method for machining a transparent medium with a laser, comprising:

forming a support of a medium which is a good absorber of a laser beam, the support having a least a first support surface;

placing a transparent medium to be machined over the first support surface, the transparent medium including a first transparent medium surface placed over the first support surface such that the first transparent medium surface faces the first support surface;

focusing the laser beam onto the first support surface through the transparent medium to produce a flame from localized heating of the first support surface;

using the flame to heat and locally melt a portion of the first transparent medium surface corresponding to a region to be machined; and causing relative movement between the transparent medium placed over the support and the laser beam to machine a desired pattern in the transparent medium.

2. A method as recited in claim 1, wherein the support is moved while the laser beam is fixed to cause the relative movement.

3. A method as recited in claim 1, wherein the laser beam is moved while the support is fixed to cause the relative movement.

4. A method as recited in claim 1, wherein the laser beam forms a groove through the first surface of the transparent medium to cut the transparent medium.

5. A method as recited in claim 1, wherein the laser beam forms a shallow groove in the first surface of the transparent medium followed by application of mechanical stress to the transparent medium to cut the transparent medium.

6. A method as recited in claim 1, wherein the laser beam scribes a character or a figure in the transparent medium.

7. A method as recited in claim 1, further comprising adjusting a thermal impact to a portion of the support at which the laser beam is focused through cooling of a focusing point of the laser.

8. A method as recited in claim 1, wherein the laser beam is emitted from a solid state laser.

9. An apparatus for machining a transparent medium by a laser comprising:

support means for supporting a transparent medium, the support means including a stripe of a material which absorbs the laser beam better than the transparent medium, a roll for winding the stripe, and a roller for guiding the stripe at a position to which a laser beam is focused;

laser beam generating means for providing a laser beam onto the support means through the transparent medium; and, moving means for moving either the support means or the laser beam.

10. An apparatus as recited in claim 9 wherein the laser beam generating means includes a solid state laser for providing a laser beam and a lens for focusing the laser beam onto the support means.

11. An apparatus as recited in claim 9, wherein the moving means for moving the laser beam includes a plurality of reflection mirrors disposed in a laser beam path, motors for moving the reflection mirrors, and a controller for controlling the motors.

12. An apparatus as recited in claim 9, wherein the moving means for moving the laser beam includes:

a reflection mirror disposed in a laser beam path;

a lens for focusing the laser beam reflected by the reflection mirror to the support means;

motors for moving the reflection mirror and the lens; and a controller for controlling the motors.

13. A method for machining a series of thin film devices disposed on a transparent medium using a laser, comprising:

providing a transparent medium having a first transparent medium surface and a second transparent medium surface, the transparent medium having a plurality of thin film devices disposed on the second transparent medium surface, the thin film devices comprising at least one thin film including active device regions and field regions;

removing a portion of the at least one thin film disposed at a field region to expose a portion of the second transparent medium surface creating an exposed region;

forming a support of a medium which is a good absorber of a laser beam, the support having a least a first support surface;

placing the transparent medium having the thin film devices formed thereon over the first support surface, such that the first transparent medium surface faces the first support surface and the thin film devices formed on the second transparent medium surface face away from the first support surface;

focusing the laser beam onto the first support surface through the exposed regions of the transparent medium to produce a flame from localized heating of the first support surface;

using the flame to heat and locally melt a portion of the first transparent medium surface corresponding to a region to be machined; and causing relative movement between the transparent medium placed over the support and the laser beam to machine a desired pattern in the transparent medium.

* * * * *